(12) United States Patent
Osher et al.

(10) Patent No.: US 9,545,084 B2
(45) Date of Patent: Jan. 17, 2017

(54) LIGHTED ANIMAL RESTRAINT WITH BREAK PREVENTION FEATURE

(71) Applicants: John D. Osher, Ft. Lauderdale, FL (US); William Babbs, Stanley (HK)

(72) Inventors: John D. Osher, Ft. Lauderdale, FL (US); William Babbs, Stanley (HK)

(73) Assignee: Litey Leash, LLC, Bedford Heights, OH (US)

( * ) Notice: Subject to any disclaimer, the term of this patent is extended or adjusted under 35 U.S.C. 154(b) by 0 days.

(21) Appl. No.: 13/910,673

(22) Filed: Jun. 5, 2013

(65) Prior Publication Data

US 2013/0333632 A1   Dec. 19, 2013

Related U.S. Application Data

(60) Provisional application No. 61/655,559, filed on Jun. 5, 2012.

(51) Int. Cl.
*A01K 27/00* (2006.01)

(52) U.S. Cl.
CPC ........... *A01K 27/006* (2013.01); *A01K 27/003* (2013.01); *A01K 27/005* (2013.01)

(58) Field of Classification Search
CPC ... A01K 27/003; A01K 27/006; A01K 27/009
USPC .......................... 119/792, 795, 797, 798, 859
See application file for complete search history.

(56) References Cited

U.S. PATENT DOCUMENTS

| | | | |
|---|---|---|---|
| 504,055 A | 8/1893 | Shaw | |
| 634,014 A | 10/1899 | Molloy | |
| 1,379,093 A | 5/1921 | Freeberg | |
| 1,879,991 A | 5/1928 | Pratt | |
| 2,593,940 A * | 4/1952 | Van Meter | 119/799 |
| 4,270,491 A | 6/1981 | Cox | |
| 4,488,511 A | 12/1984 | Grassano | |
| 4,513,692 A * | 4/1985 | Kuhnsman et al. | 119/795 |
| 4,887,552 A * | 12/1989 | Hayden | 119/793 |
| 5,005,527 A | 4/1991 | Hatfield | |
| 5,558,044 A | 9/1996 | Nasser, Jr. et al. | |
| 5,850,807 A * | 12/1998 | Keeler | 119/799 |
| 5,967,095 A * | 10/1999 | Greves | 119/795 |
| 6,330,949 B1 | 12/2001 | DeRisio | |
| 6,557,498 B1 * | 5/2003 | Smierciak et al. | 119/858 |
| 6,727,826 B1 | 4/2004 | Ki Kwan et al. | |
| 6,840,655 B2 | 1/2005 | Shen | |
| 6,846,094 B2 | 1/2005 | Luk | |
| 6,857,924 B2 | 2/2005 | Fu et al. | |
| 7,410,197 B2 | 8/2008 | Edwards | |
| 7,530,334 B1 * | 5/2009 | Napolitano | 119/798 |

(Continued)

OTHER PUBLICATIONS

Web Page: http://sldtools.en.alibaba.com/productshowing—Jinhua Solid Tools Co., Ltd., high quality fashionable stretch dog leash, 2 pages, dated Aug. 6, 2012 11:47am.

(Continued)

*Primary Examiner* — David Parsley (74) *Attorney, Agent, or Firm* — Fay Sharpe LLP (57) ABSTRACT

An illuminated animal restraint includes a leash having an elongated body; a plurality of light sources positioned along the elongated body; the light sources are connected by wiring which has a configuration to accommodate pull and sideway forces applied to the leash without damage to the wiring and light sources.

16 Claims, 12 Drawing Sheets

(56) References Cited

U.S. PATENT DOCUMENTS

| | | | |
|---|---|---|---|
| 7,536,980 B2 * | 5/2009 | Cooper | 119/795 |
| 7,594,482 B1 * | 9/2009 | Toplin | 119/792 |
| 7,690,331 B2 | 4/2010 | Hurwitz | |
| 2006/0221599 A1 | 10/2006 | Hornsby et al. | |
| 2008/0091097 A1 | 4/2008 | Linti et al. | |
| 2011/0000440 A1 * | 1/2011 | Mucerino et al. | 119/709 |

OTHER PUBLICATIONS

Web Page: http://sldtools.en.alibaba.com/product-go—Jinhua Solid Tools Co., Ltd., Best selling stretch dog leash retractable double dog leash retractable leash with led light, 3 pages, dated Aug. 6, 2012 11:48am.

PCT International Search Report, mailed Sep. 4, 2013, 2 pages.

\* cited by examiner

LIGHTED ANIMAL RESTRAINT WITH BREAK PREVENTION FEATURE

CLAIM OF PRIORITY

This application claims priority from U.S. Provisional Patent Application Ser. No. 61/655,559, filed on Jun. 5, 2012, which is incorporated herein in its entirety.

BACKGROUND OF THE DISCLOSURE

The present disclosure relates to animal or pet restraints. More particularly, it relates to a collar and leash which are illuminated by LEDs or light sources especially used for walking a pet or animal during dusk or nighttime hours to increase visibility as well as safety for both the pet and pet owner or walker in dark or dimly lit situations and environments.

Walking a pet at night or at dusk can pose visibility and safety issues for pets and their owners. Being visible to automobiles, bikes, etc. can prevent injury or harm to either the pet or the pet owner or walker. Thus, there is a need for leashes and collars which are illuminated.

Existing collars and leashes are often reflectively illuminated and rely on external light to trigger the reflective illumination.

Still other leashes use button cells instead of batteries and thus do not have sufficient power for illuminating the leash brightly or for long periods of time.

Some existing illuminated pet leashes are made of outer components that allow for stretching (e.g., polypropylene or nylon strap and PVC tubing.) However, no existing leashes appear to allow the internal wire mechanisms of an illuminated dog leash to accommodate this simultaneous external stretching or expansion as a result of pulling or tugging on the leash. For example, when illuminated pet leashes are pulled and the outer material stretches, the tension on the internal lighting components causes them to break and results in a malfunctioning leash. Moreover, no existing illuminated pet leashes appear to allow for side to side pull forces on the wire which tends to bend the wire back and forth until it breaks.

Accordingly, there is a need for an illuminated animal or pet collar and leash which has a feature to prevent breaking of the lighting system from pulling or sideway forces and which overcomes the above-mentioned deficiencies and others while providing better overall results.

SUMMARY OF THE DISCLOSURE

The present disclosure relates to animal or pet restraints. More particularly, it relates to a pet or animal collar and leash which are illuminated by light sources such as Light Emitting Diodes (LEDs) especially used for walking a pet or animal at dusk or at night.

One aspect of the disclosure is a lighted animal restraint including a plurality of selectively enabled lights having an in-packaging try-me feature for selective sampling of restraint operation before purchase, and time out circuits to time out the try-me feature and an on-enabling circuit for the restraint.

Another aspect of the disclosure is a lighted animal restraint including a plurality of selectively enabled lights connected with a wiring having a configuration such as an extendable fold to accommodate stretching of the restraint without wiring damage.

Another aspect of the disclosure is internal components of the leash, such as copper wire around solder joints, simultaneously stretch when the leash is pulled and the external leash embodiment stretches. This prevents damage to any of the functional internal components that that would normally be damaged by stretching (e.g., pulling or tugging by a pet or tension that arises during use).

Another aspect of the disclosure is extra reservoirs or folds of copper wire such as Z-shaped folds in the wire are included within the housing of the leash that allow the overall used length of wire to unfold and effectively stretch and expand when pulled, thus protecting solder joints and connections and preventing breaking of the lighting system.

Another aspect of the disclosure is the provision of a spring within the leash which absorbs side to side forces exerted by an animal and further protects the wiring from breaking.

In accordance with one aspect of the disclosure, an illuminated animal restraint has an elongated leash having a flexible housing having a plurality of selectively enabled light sources extending along the flexible housing, the light sources have a timer assembly which enables selectively sampling operation of the light sources and enables continuous and intermittent operation of the light sources; and the selectively enabled light sources are connected with wire configured to accommodate stretching of the restraint without wire or light source damage.

In accordance with another aspect of the disclosure, an illuminated animal restraint has a leash and/or collar having an elongated body; a plurality of light sources positioned along the elongated body; the light sources are connected by wiring which has a configuration to accommodate pull and sideway forces applied to the leash and/or collar without damage to the wiring.

In accordance with still another aspect of the disclosure, a lighted animal restraint has a plurality of selectively enabled lights having a try-me timer for selective sampling of restraint operation, and time out circuits to time out the try-me timer and an on-enabling circuit for the restraint.

Still another aspect of the disclosure is an illuminated animal restraint in the form of a leash or collar having a try-me timer circuit including, a plurality of light sources housed by the restraint, a controller housed within a handle for the restraint, the controller operably connected to an enable sensor, wherein when the enable sensor indicates that the restraint is in normal mode of operation, the controller produces a signal to light the light sources continuously or intermittently, and, wherein when the enable sensor indicates that the restraint is in a try-me mode, the controller monitors a length of time that the controller produces a signal to light the light sensors.

Still another aspect of the disclosure is a gripping handle which is ergonomically shaped of flexible or rigid material so the user can hold it and operate the lighting function with one hand.

Yet another aspect of the disclosure is the handle can house AAA batteries as opposed to button cells to provide longer lasting power to the lighting system.

Still another aspect of the disclosure is a loop or strap around the handle so the user can use the device as a normal pet leash.

Another aspect of the disclosure is the handle has a "try-me" feature so a consumer can try the lighting feature at the point of purchase.

Still another aspect of the disclosure is the LED lights in the leash can extend when pulled without breaking and can withstand a pull force exerted by an animal of about one hundred (100) pounds weight.

Other aspects of the disclosure will become apparent upon a reading and understanding of the following detailed description.

DETAILED DESCRIPTION OF THE DISCLOSURE

With reference to FIGS. 1-15, a preferred embodiment of a lighted animal or pet restraint in the form of a collar and leash are shown and described. The Figures illustrate a preferred embodiment of the disclosure only and the disclosure is not limited to the embodiments of the Figures. The restraint may include a collar, a leash, or a combination of both.

Figure 1:
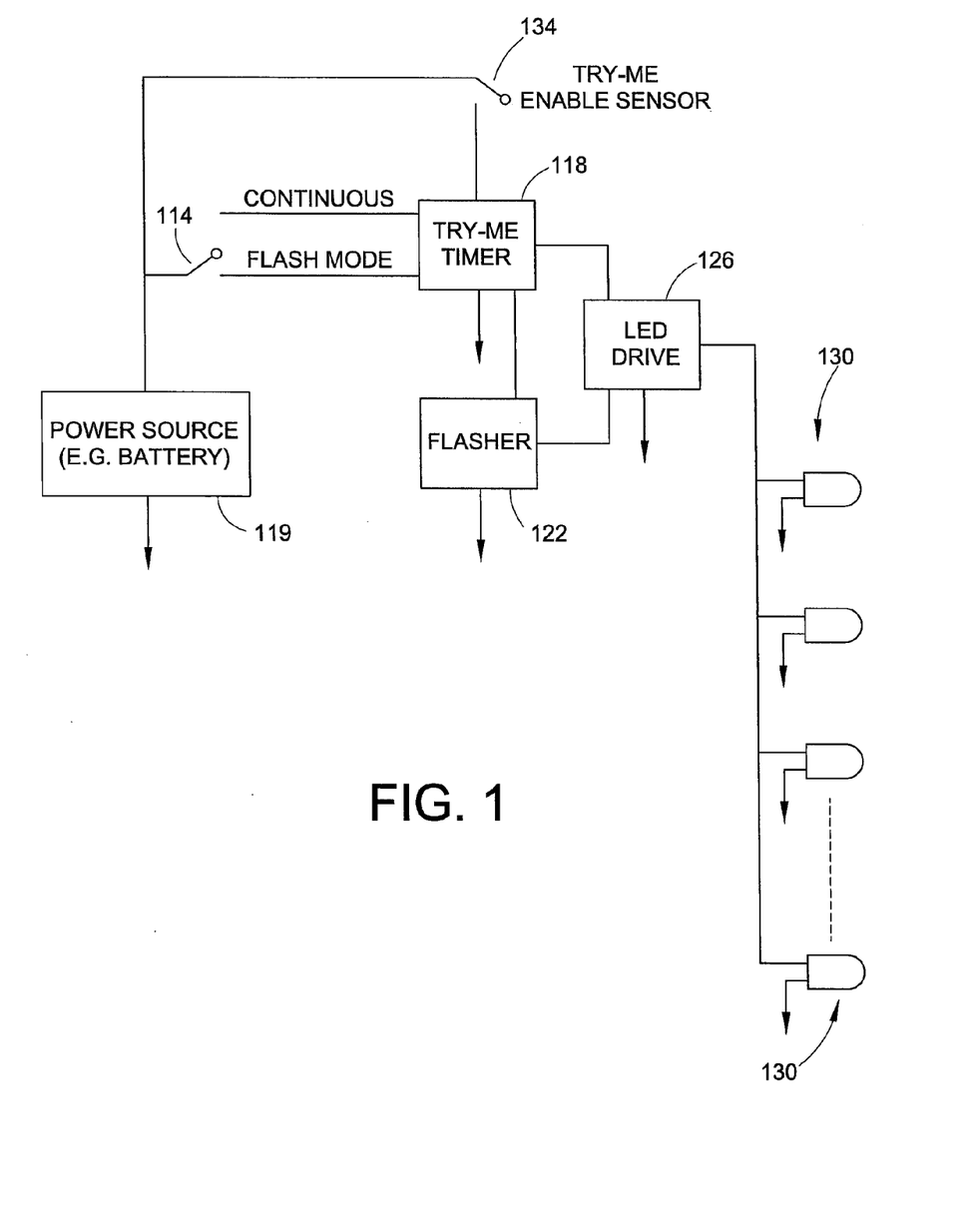
FIG. 1 is a block diagram of a lighted animal restraint in accordance with one aspect of the disclosure.

Referring now to FIG. 1, lighted animal restraints typically include physical and electronic aspects. Physical embodiments of the restraints may include collars and leashes. From an electrical or electronic standpoint, the restraints include provisions for a power source (e.g., a battery) 110, a control switch 114, a try-me timer 118, a flasher circuit 122, an LED or light source drive 126 and a plurality of light sources or LEDs 130.

The power source provision 110 can include a chamber and electrical contacts for receiving a battery such as one or more button cells, AA or AAA batteries. Other batteries such as C and/or D batteries can also be used in some embodiments. Some embodiments also allow for solar cell recharging of an energy storage device such as a battery or capacitor.

The control switch 114 can be a multi-position switch or a switch that cycles between positions. One position is an open position for turning the animal restraint off (i.e., a de-powered state). A second position connects the power source provision to energize flash mode circuitry 122 and a third position connects the power source to energize a continuous light mode circuit.

For instance, a try-me timer 118 can be enabled or disabled via a try-me enable sensor 134. For instance, the try-me enable sensor senses that the lighted animal restraint is in original packaging. When the try-me timer 118 is enabled, the timer is triggered when the lighted animal restraint is placed in flash mode or continuous mode by the control switch 114. At the beginning of the timing cycle the try-me timer 118 provides power either directly to the LED or light source drive 126 or through the flasher 122, depending on the position of the control switch 114. At the end of the timing cycle, power is removed from the flasher 122 or light source drive 126 until the control switch 114 changes state to one of the continuous or flash mode positions.

When the try-me enable sensor 134 senses that the lighted animal restraint is no longer included in its original packaging, the try-me timer is bypassed and power is delivered to the light source drive 126 either directly or through the flasher 122 according to the position of the control switch 114.

Figure 5:
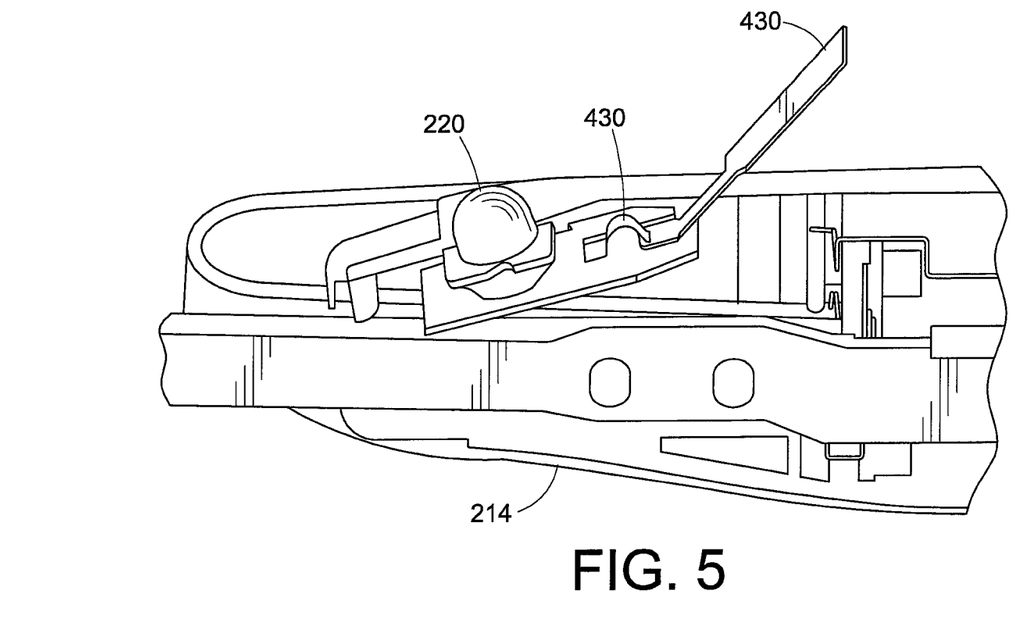
FIG. 5 shows aspects of a try-me enable sensor in a handle of an embodiment in the form of a leash.
Figure 6:
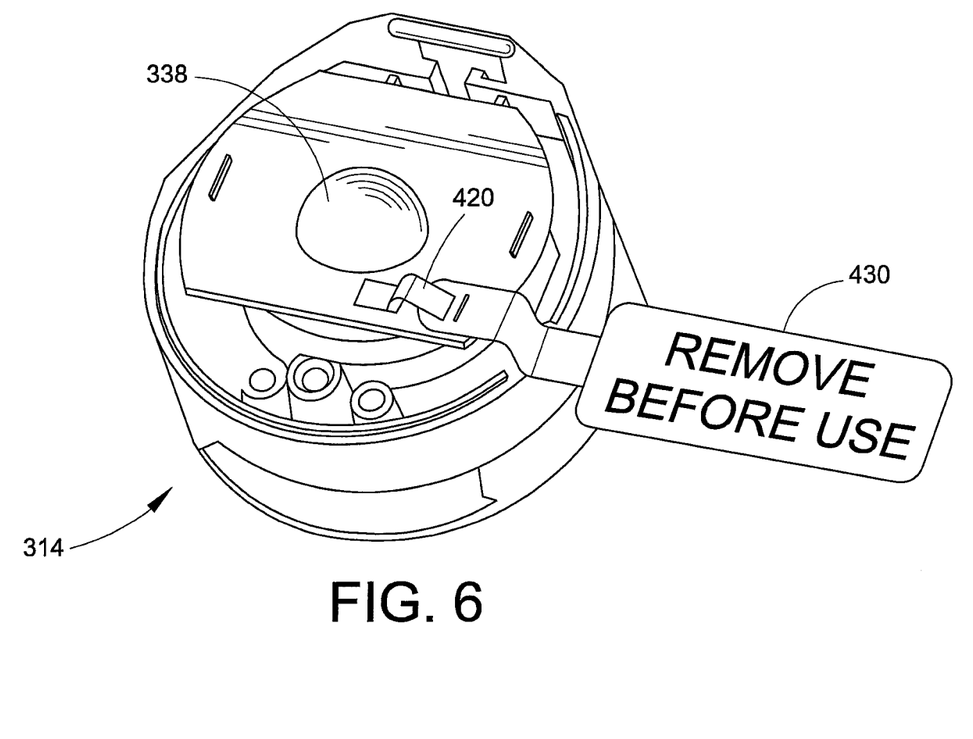
FIG. 6 shows aspects of a try-me enable sensor in a housing of an embodiment in the form of a collar.

For example, the try-me enable sensor 134 can be a pair of electrical contacts. As indicated in FIGS. 5 and 6, electrical contacts 420 can be separated by an insulator 430 such as a paper or plastic insulator tab while the lighted animal restraint is in display packaging. The act of removing the lighted animal restraint from the display packaging can remove the insulator 430 from between the contacts. Alternatively, a consumer might manually remove the insulator from between the contacts upon purchase and first use of the lighted animal restraint. Note that in each of FIGS. 5 and 6 one of the electrical contacts 420 is visible and another is hidden by the illustrated insulator 430.

Referring again to FIG. 1, the light source drive 126 receives power either from the try-me timer 118 or from the flasher 122. Power received from the try-me timer is continuous as long as the enabled timer permits the power flow or as long as a disabled try-me timer and control switch 14 provide power. If power is received by the light source drive 126 from the flasher, then the power received is intermittent according to a frequency and duty cycle selected for the flasher 122. The light source drive 126 provides power to at least one light source. For example, the light source drive 126 provides power at an appropriate voltage and/or current to the plurality of light sources 130.

The plurality of light sources 130 preferably includes a plurality of light emitting diodes (LEDs) such as, for example, one or more of white, blue, red, green, pink, yellow, amber, orange, or other desired colors, or infrared light emitting diodes. LEDs which use multiple color combinations may also be used. The light sources 130 are distributed along a length of the animal restraint, such as, for example, along the length of the leash or the length of the collar for a dog or other animal. The light sources can be evenly or unevenly spaced as desired.

Figure 2A:
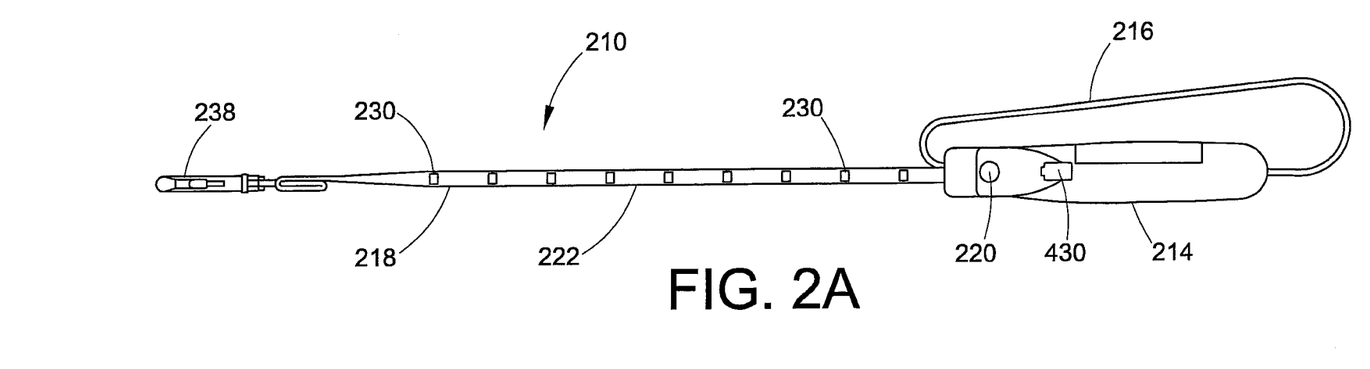
FIGS. 2A and 2B are a top plan view and a side elevational view of the lighted animal restraint of FIG. 1 in the form of a leash.
Figure 2B:
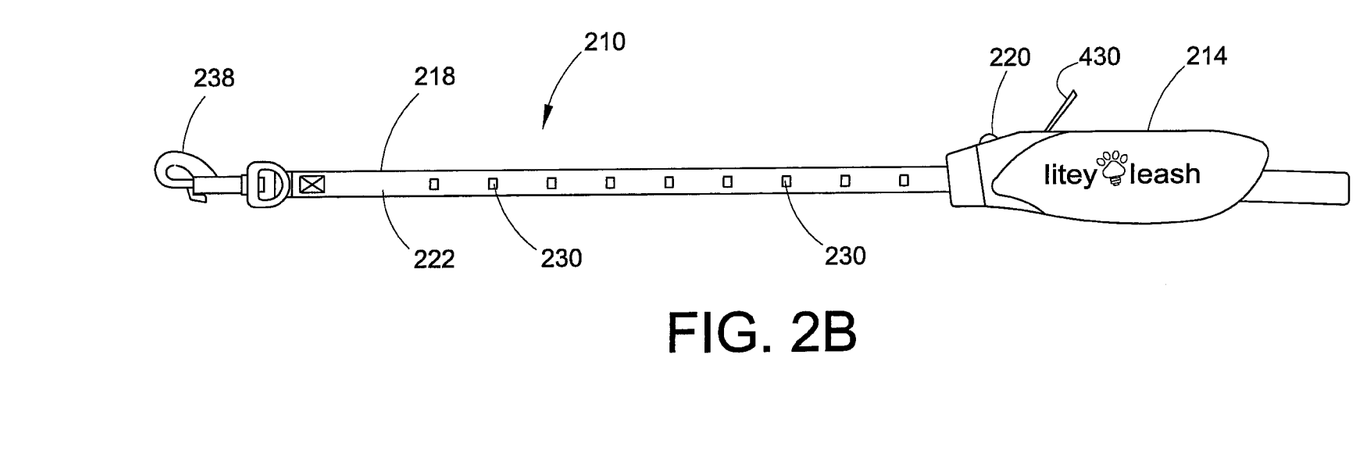

For example, referring now to FIGS. 2A and 2B, a physical embodiment of an animal or pet restraint in the form of a leash 210 can include a handle 214, handle strap 216 connected to and extending from the handle and lead or strap 218 extending from the handle.

The handle can include a button or control switch 220 and other electrical or electronic components. For example, a slot may be provided in the handle for receiving an insulator 430 for separating contacts of a try-me enable sensor 134. Provisions for a power source 110, as well as a try-me timer 118, flasher 122 and light source or LED drive 126 can also be housed internally within the handle.

The lead 218 provides a flexible housing 222 for a plurality of light sources or LEDs 230. For instance, a transparent or translucent material in the form of a flexible tube or cylinder is used for the housing 222. For example, the lead 218 can be made of woven nylon or any suitable flexible material. An assembly of conductors and light sources 230 can be mounted and/or housed within the flexible tube or cylinder. The conductors are tied to a common, earth or ground and an LED drive output 126 at a lead 218 end within the handle 214 and to each of the light sources or LEDs within the lead portion. The lead portion 218 can terminate in, or with, an attachment device 238. For example, the attachment device 238 can be a clip or buckle, swivel spring release or other suitable device for releasable attachment of the leash to a collar or a harness or any other restraint.

The handle strap 216 can be made of the same or different material as the lead 218. For instance, in some embodiments the handle strap is leather or an imitation leather material such as vinyl. The handle strap 216 and handle 214 can cooperate to secure the leash in a hand of a user such as a pet walker. The length of the lead 218 can be any desired length, such as, for example, three, four, five, six or more feet. The LEDs or light sources can be distributed at any desired spacing along the entire or only a portion of the lead length.

Figure 3A:
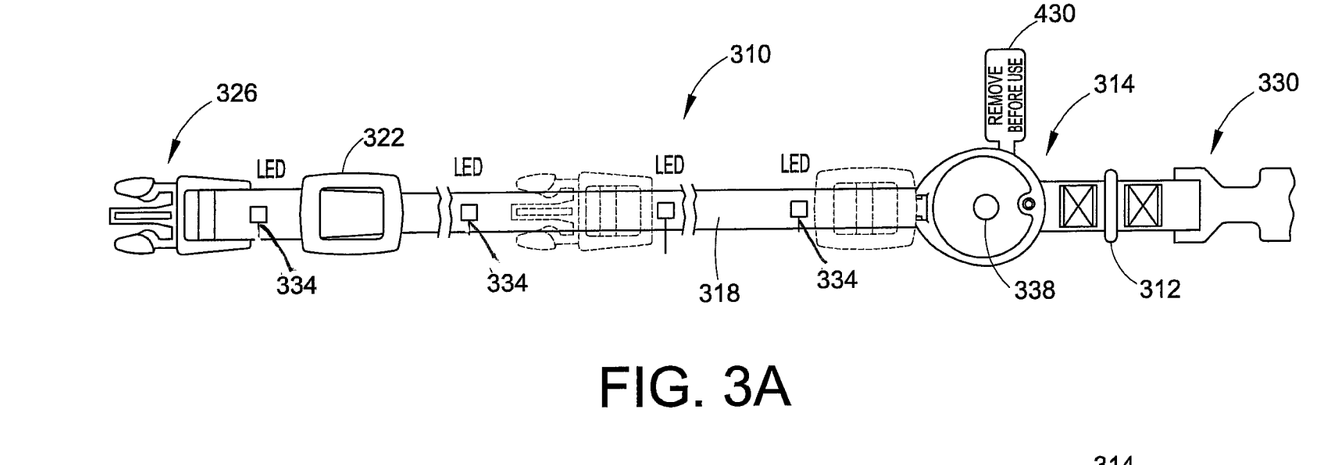
FIGS. 3A and 3B are a top plan view and a side elevational view of an embodiment of the lighted animal restraint of FIG. 1 in the form of a small sized collar.
Figure 3B:
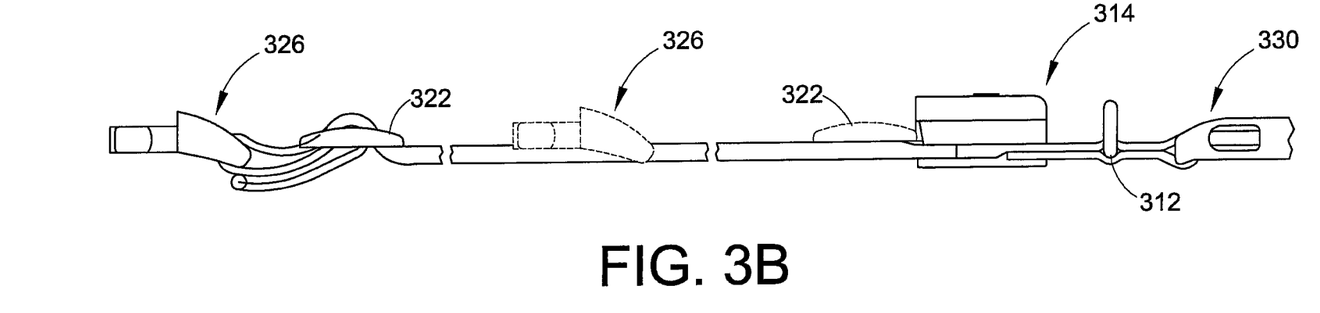

Referring now to FIGS. 3A and 3B, an embodiment in the form of an animal or pet collar 310 includes a tab portion 312, housing 314, collar portion 318, slide 322, male clasp 326, female clasp 330 and plurality of LEDs 334. The housing 314 can include a control switch or button 338 and the other electronic or electrical portions (e.g., 110, 118, 122, 126) described above with respect to FIG. 1 can be housed within the housing 314.

The tab portion 312 can include an attachment such as a ring or D-shaped ring for connecting to a leash. The tab portion can also provide a mounting portion for the housing 314.

The slide 322 provides a mechanism for adjusting the size of the collar portion 318. For instance, the slide can be moved to adjust the size of the loop formed by the collar to accommodate relatively large animals. Alternatively, the male clasp 326 and female clasp 330 can be connected to each other to form a smaller loop including the tab 312 and doubled up portions of the collar portion 318.

Figure 4A:
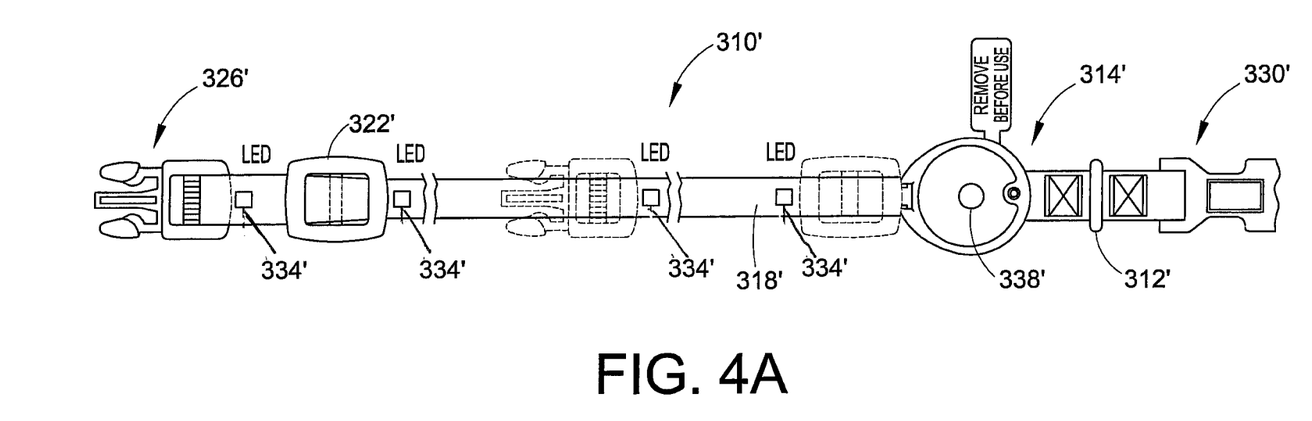
FIGS. 4A and 4B are a top plan view and a side elevational view of a medium sized collar.
Figure 4B:
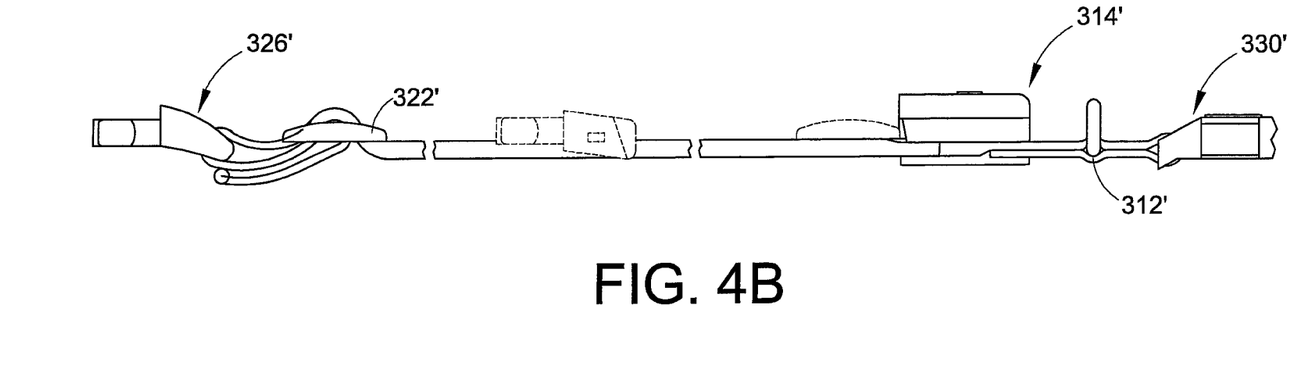

FIGS. 4A and 4B show a medium sized collar as opposed to a small sized collar as shown in FIGS. 3A and 3B. Similar components in FIGS. 4A and 4B are labeled with the same reference numerals as in FIGS. 3A and 3B, but with an asterisk.

As with the leash 210, the collar portion 318 can be made from transparent or translucent flexible tubular or cylindrical material such as woven nylon. As with the lead portion 218 of the leash 210, the collar portion 318 can provide a housing or mounting for electrical conductors and the plurality of light sources or LEDs 334.

In operation, for example, a first press, slide or twist of the control switch 114, 220, 338 places the leash 210 or collar 310 in a first mode such as a continuous mode and a second press, slide or twist places the restraint in a flasher "on" mode. In the flasher mode, the light sources (130, 230, 334) are powered intermittently by the LED or light source drive 126 and therefore produce light intermittently. This mode can extend power source or battery life as compared to continuous mode. A third press, slide or twist of the control switch 114, 220, 338 returns the restraint to an off state.

In some embodiments, many of the functions and modules depicted in FIG. 1 can be embodied in a programmed microcontroller. For example, referring now to FIG. 7, a microcontroller 612, with programmed internal memory, provides the functions of the try-me timer 118, the flasher 122 and a portion of the function of the control switch 114.

Figure 7:
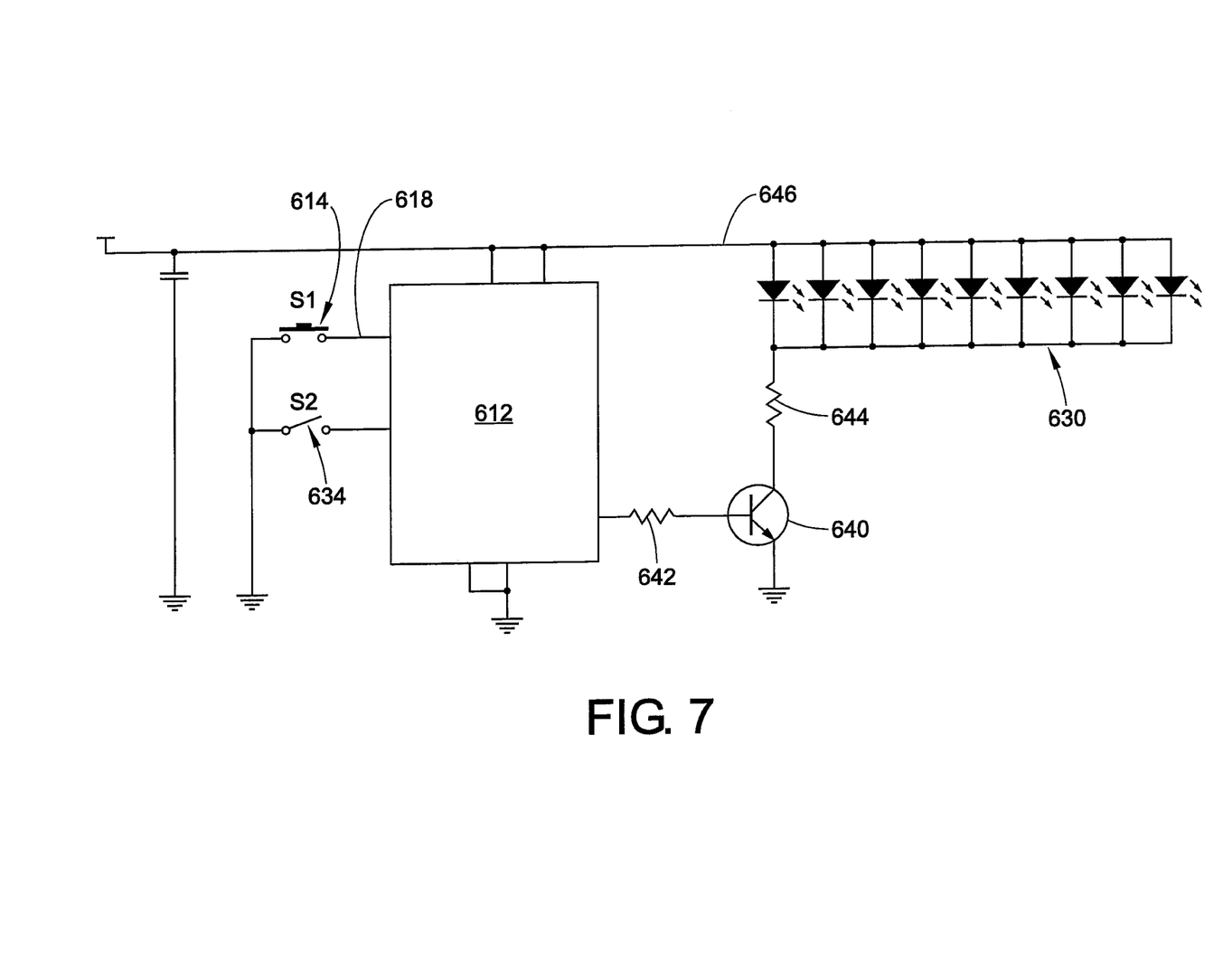
FIG. 7 is a schematic diagram of an embodiment of a circuit reflecting the block diagram of FIG. 1.

For instance, a control button 614 (S1) is connected to an input 618 of the microcontroller. A second switch (S2) or set of electrical contacts (e.g., 420) is provided as a try-me enable sensor 134, 634. As indicated in FIG. 8, if the try-me enable sensor 634 (S2) indicates (step 720) that the lighted restraint has been removed from its display packaging and has been placed in a normal operation mode (e.g., by removal of an insulator e.g., 430) then the microcontroller 612 reacts to a first press (step 724) of the control button 614 (S1) by entering a normal mode (step 730) and producing (step 732) a signal to light a plurality of light sources 630 continuously or intermittently.

Figure 8:
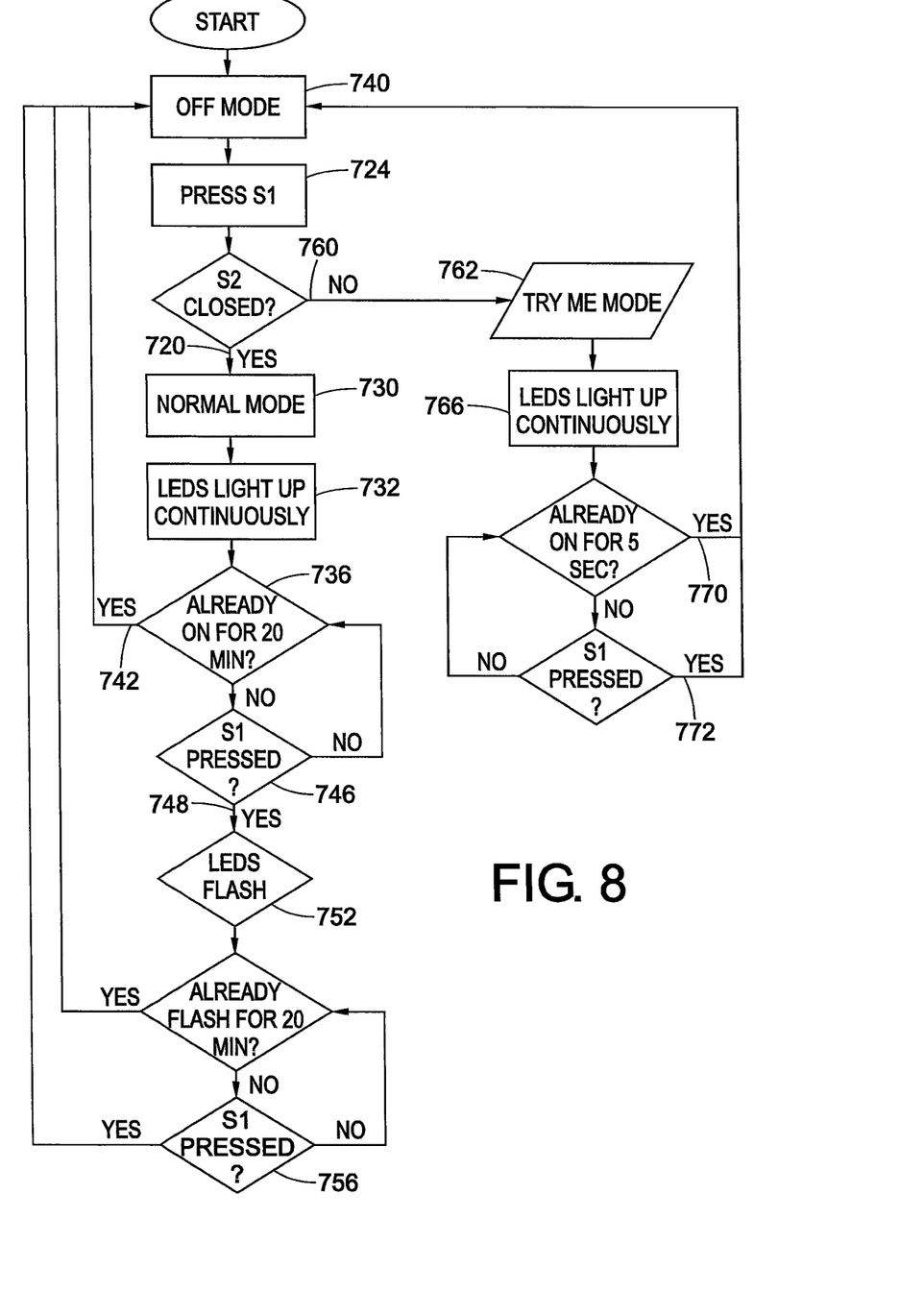
FIG. 8 is a flow chart outlining aspects of the operation of the circuit of FIG. 7.

As further illustrated in the embodiment of FIG. 8, the lighted restraint includes a battery saving feature not illustrated in FIG. 1. That is, the microcontroller 612 monitors (step 736) the length of time that microcontroller 612 produces (step 732) the signal to light the plurality of light sources. After, for example 20 (twenty) minutes, with no further input from the control button 614 (S1), the microcontroller 612 will return (step 742) the lighted restraint back to an off mode (step 740). This time can set to a shorter interval or a longer interval or even extended to an infinite time by removing the feature entirely.

If (step 746) the control button 614 (S1) is (step 748) pressed a second time during that interval (e.g., 20 min.), the microcontroller 612 places the lighted restraint in intermittent or flash mode and produces (step 752) an intermittent signal to light the plurality of light sources intermittently. If the control button 614 (S1) is pressed (step 756) a third time, the microcontroller 612 returns the lighted restraint to the off mode (step 740).

In this way, the microcontroller 612 embodies and performs part of the function of the control switch 114 and the flasher 122 as well as the function of the try-me timer 118 when the try-me timer 118 is enabled.

If the switch or set of contacts (S1) of the try-me enable sensor 634 are not closed (step 760) (e.g., if they are held open by an insulator or other mechanism), the microcontroller 612 enters a try-me mode (step 762) wherein the microcontroller 612 produces (step 766) a signal to light the plurality of light sources 630 continuously for a short period of time.

As further illustrated in the embodiment of FIG. 8, in try-me mode, the microcontroller 612 provides the battery saving feature of the try-me timer 118 of FIG. 1. That is, the microcontroller 612 monitors (step 736) the length of time that microcontroller 612 produces (step 766) the signal to light the plurality of light sources 630. After, for example, 5 (five) seconds, with no further input from the control button 614 (S1), the microcontroller 612 returns (step 770) the lighted restraint back to the off mode (step 740) unless the control button 614 (S1) is pressed a second time before the 5 seconds expire, in which case, the microcontroller 612 returns (step 772) the lighted restraint back to the off mode earlier. In some embodiments the time set point is longer or shorter. In some embodiments, a flasher mode may be available, even in try-me mode.

In this way, the microcontroller 612 embodies and performs the remaining part of the function of the control switch 114, the flasher 122 as well as the function of the try-me timer 118 when it is enabled.

In the embodiment of FIG. 7, the light source or LED drive 126 is embodied by a transistor 640, two resistors 642, 644 and a conductor 646 delivering electricity from a power source (not shown) (e.g., a battery in power source provision 110). When the microcontroller 612 produces a signal (e.g., steps 732, 752, 766) for lighting the light sources, a current, limited by first resistor 642 flows into the transistor 640 turning the transistor 640 on or into a conducting state. This allows current to flow through the light sources 630, the second current limiting resistor 644 and the transistor toward a return line to the power source provision 110. When the signal (e.g., steps 732, 752, 766) is removed, either because the signal is intermittent (step 766) or because the lighted restraint has been returned to the off mode (step 740), current no longer flows through the first resistor 642, the transistor 640 is placed in an off state and significant current is prevented from flowing through the light sources 630, second resistor 644 and transistor 640.

Figure 9:
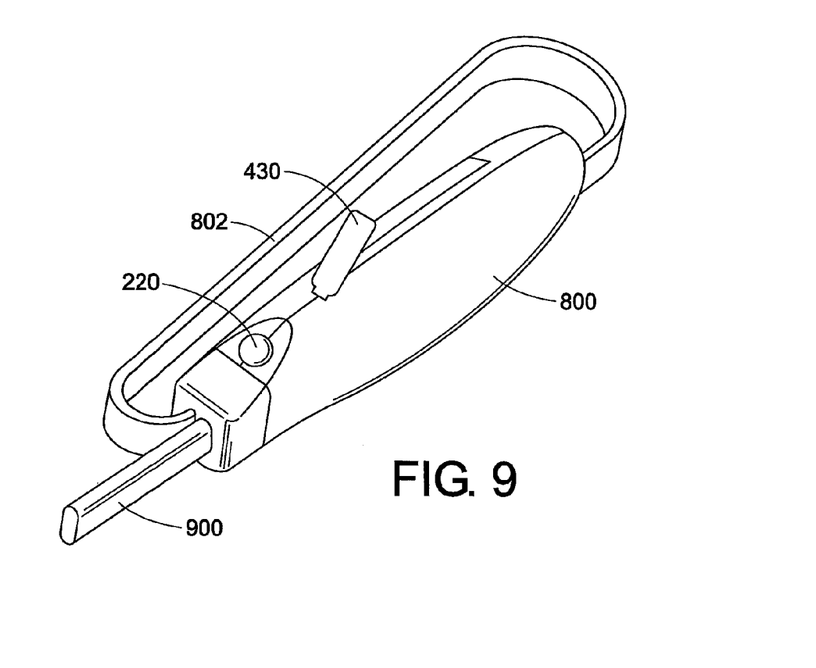
FIG. 9 is a perspective view of an embodiment of a leash handle.
Figure 10:
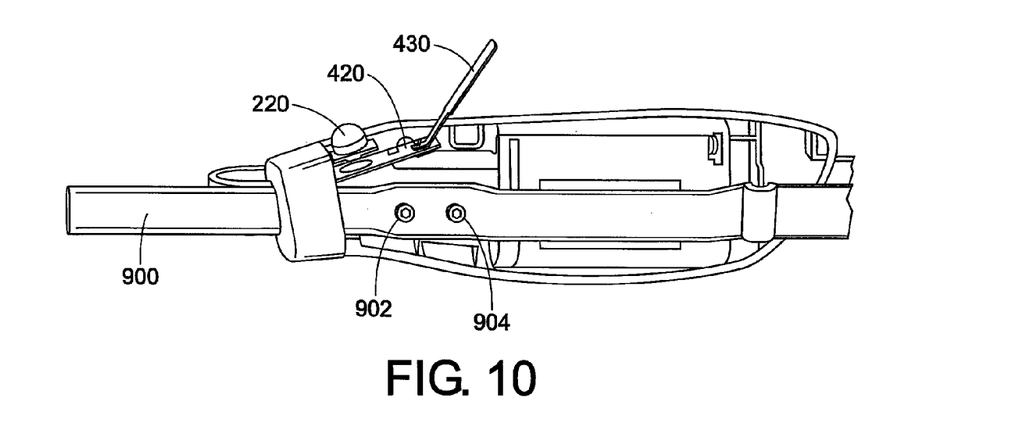
FIG. 10 is a cross-sectional view of FIG. 9.
Figure 11:
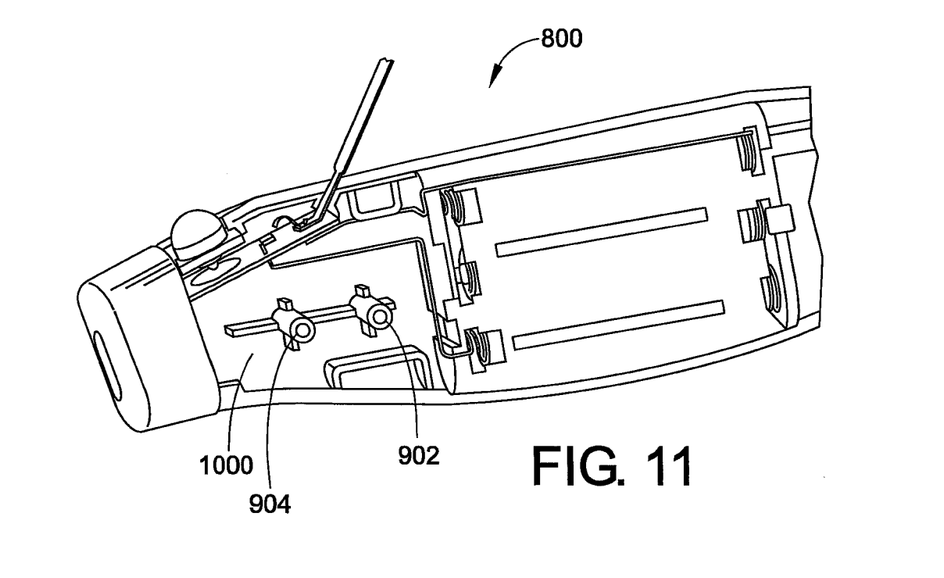
FIG. 11 is yet another cross-sectional view particularly showing strengthening posts therein.
Figure 12:
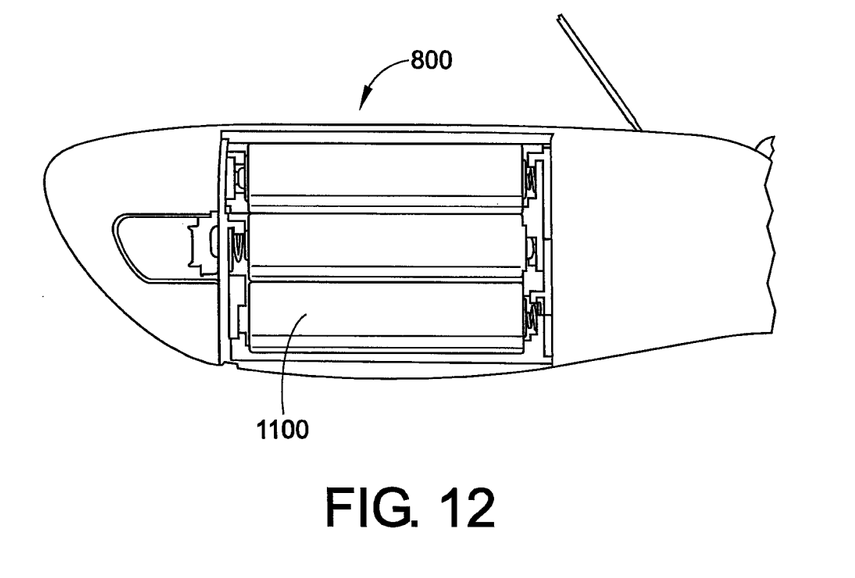
FIG. 12 is another cross-sectional view showing a battery housing chamber.

With reference now to FIG. 9, it can be seen that the handle embodiment has an ergonomically designed shape so that a user can easily hold it and operate the illuminating function with only one hand by depressing button 220. The handle 800 preferably has a textured surface to prevent slipping off of the hand of a user. The handle can be made of two rigid halves secured together, or it can be made of flexible material. A loop or strap 802 around the handle 800 additionally secures the handle to the hand of a user in the manner of a conventional animal leash. In FIG. 10 it can be seen that leash strap 900 is located and held in place by two fasteners or posts 902, 904. The assembly of the two posts extending through the leash 900 provides a robust assembly which can withstand a pull force exerted by an animal that weighs about 100 pounds, such as a dog. In FIG. 11 the posts 902, 904 can be seen to be depending from and buttressed against the side wall 1000 of the handle 800. In FIG. 12 it can be seen that the handle 800 houses three AAA alkaline batteries 1100 to provide the product with greater power and a longer lasting ability. Other batteries can also be used without departing from the scope of the disclosure.

Figure 13A:
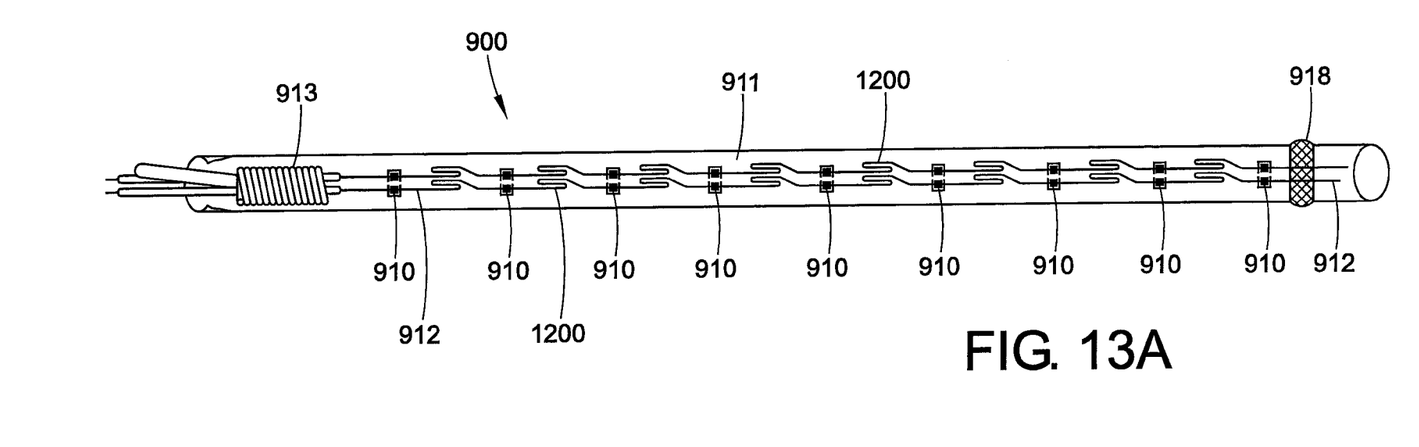
FIG. 13A is a schematic view of the wiring embodiment within a leash.
Figure 13B:
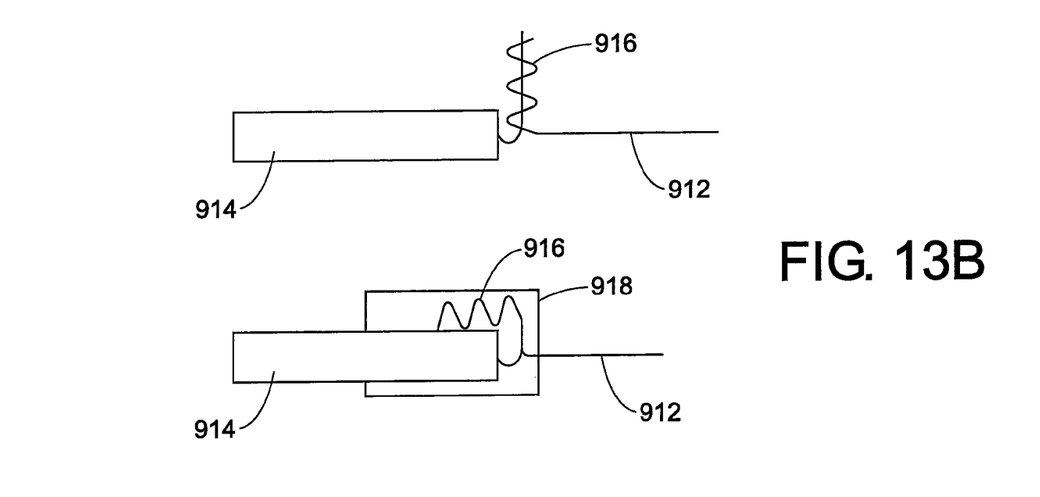
FIG. 13B is an enlarged side elevation view of soldered wires in a heat shrink tube.

With particular reference to FIGS. 13A and 13B, it can been seen that leash 900 includes a plurality of lights 910 housed within a flexible housing or tube 911, such as a polyvinyl chloride (PVC) tube that are connected via a wire arrangement 912, such as copper wire, that prevents breakage of the lighting wire system. That is, the wire configuration allows the leash to extend on a pull from an animal that weighs about 100 pounds, such as a dog, without breaking the electrical wiring. While PVC tube is stretchable copper wires typically are not. Accordingly, a break prevention feature has been added to the wiring to allow the wire to extend or "stretch".

Additionally, a spring 913 such as a helical coil spring can be positioned inside the tube near the handle to protect the wires and absorb and reduce the force exerted on the wiring in the leash from side to side pull forces from an animal, such as a dog, running or moving in a sideways or back and forth motion. The spring further provides protection and aid in enclosing the wires in the housing. Copper wires 912 within the tube necessarily are of different lengths, otherwise the system will short circuit.

Referring to FIG. 13B, copper wires 912 and lead wire such as stranded wire 914 are dipped in melted solder. Dipped wire 916 is bent towards the lead wire within a heat shrink tube 918.

Folds 1200 such as substantially "Z" shaped folds in the copper wires 912 in between the LEDs 910 as shown allows the wire to effectively stretch with a spring-like operation at the folds when the folds are unfolded during a pull or when the leash is extended during occasional animal pulling thereon. Other fold shapes, such as an "S" shape, a "W" shape, or an "M" shape fold, is also contemplated by the disclosure. Such a wiring folded arrangement can withstand a pull force applied to the leash by an animal weighing about 100 pounds, such as a dog.

Figure 14:
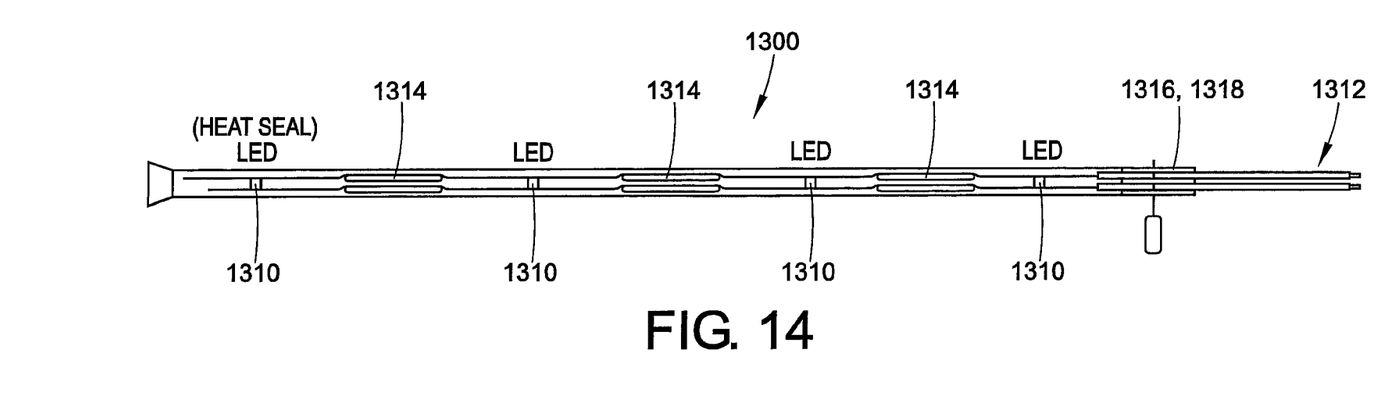
FIG. 14 is a schematic view of the wiring embodiment within a small sized collar.
Figure 15:
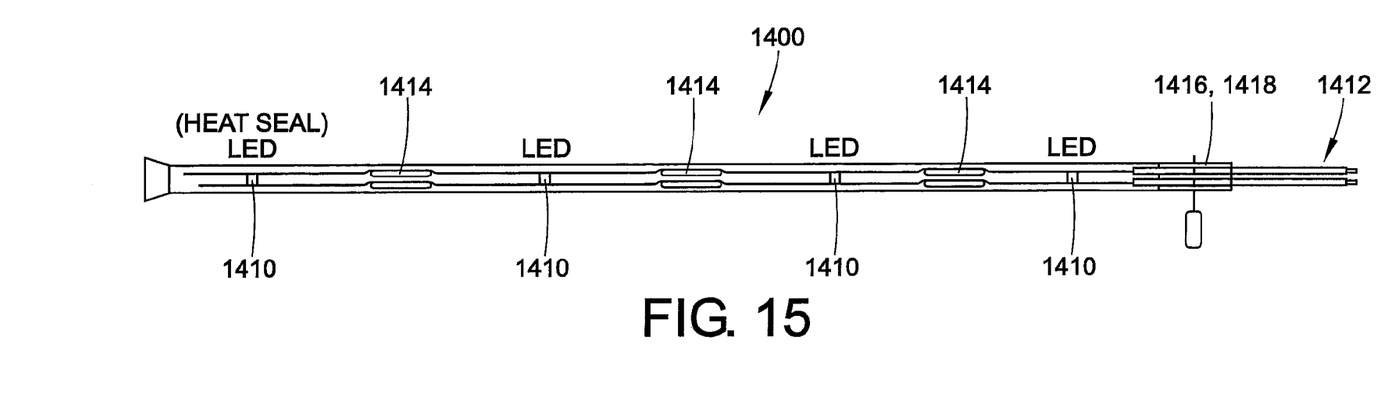
FIG. 15 is a schematic view of the wiring embodiment within a medium sized collar.

Referring now to FIGS. 14 and 15, a small collar 1300 and medium collar 1400 are shown respectively. Each collar can have a plurality of LEDs or light sources 1310, 1410 spaced along the collar that are connected to a wire arrangement 1312, 1412 that allows the collar to extend as a result of a pull force, but will not break the electrical wiring. Preferably the LEDs are positioned or located away from the buckle or clasp 238, so they are less likely to break. Specifically, three folds 1314, 1414, such as substantially Z-shaped folds, in copper wires 1312, 1412 in between the LEDs as shown allows the wire to effectively stretch with a spring-like operation at the folds when the leash is extended during an occasional instance when the animal or user pulls or tugs on the collar. The wiring arrangement can withhold a pulling force exerted by an animal weighing about one hundred (100) pounds. The copper wires 1312, 1412 are of different lengths in each collar, otherwise the system will short circuit. The wires are melted or dipped in melted solder. The dipped wire 1316, 1416 is bent toward a lead wire in a heat shrink tube 1318, 1418.

A spring could also be added to absorb sideways forces applied from side to side movement of the animal.

The embodiments described above are illustrative only. Various other embodiments are encompassed or contemplated by the disclosure. For example, the wiring system for the light sources can be remotely activated. Also, other illumination can be added to the system such as on the handle.

What is claimed is:

1. An illuminated animal restraint comprising:
   an elongated leash;
   said leash comprising a flexible housing having a plurality of selectively enabled light sources extending within and along said flexible housing, said light sources having a try-me timer assembly which enables selectively sampling operation of said light sources and enables continuous and intermittent operation of said light sources;
   said selectively enabled light sources are connected with wire configured to accommodate stretching of the restraint without wire or light source damage having a plurality of substantially Z-shaped folds in between said light sources;
   said flexible housing comprises a spring interposed at a first end of said housing adjacent a handle for gripping and holding said leash, said spring configured to accommodate stretching of said restraint and absorb sideways forces exerted on said wire without wire or light source damage;
   wherein said wire extends through said spring and said spring encloses at least a portion of said wire; and
   a try-me enabling sensor positioned substantially within said handle for enabling or disabling said try-me timer, wherein said try-me timer is also positioned substantially within said handle; wherein said try-me enabling sensor comprises a pair of contacts which are separated by an insulator extending out of said handle.

2. The animal restraint of claim 1, wherein said flexible first housing of said leash is formed of transparent or translucent material.

3. The animal restraint of claim 2, wherein said light sources comprise light emitting diodes.

4. The animal restraint of claim 3, wherein said handle comprises:
a housing having a control switch, power source; said timer assembly; and a light source device within said housing.

5. The animal restraint of claim 4, wherein said power source comprises a plurality of batteries.

6. The animal restraint of claim 5, wherein said control switch is pressed to activate a first mode wherein said light sources are continuously illuminated and is pressed to activate a second mode wherein said light sources flash intermittently.

7. The animal restraint of claim 1, wherein said enable sensor indicates that the restraint is in a normal mode of operation or a try me mode of operation.

8. The animal restraint of claim 7, wherein said restraint further comprises a collar, wherein said leash is selectively attached to said collar.

9. The animal restraint of claim 7, wherein an attachment device selectively attaches said leash to said collar, said attachment device comprises one or more posts mounted to said handle.

10. An illuminated animal restraint comprising:
a leash comprising an elongated body;
a handle for gripping said leash, said handle comprises a try-me timer assembly for selectively sampling operation of light sources and a try-me sensor for enabling and disabling said try-me timer wherein said try-me timer is substantially housed in said handle; wherein said try-me sensor is an enabling sensor substantially housed in said handle and comprising a pair of electrical contacts separated by an insulator extending out of an opening in said handle;
a plurality of said light sources positioned along said elongated body;
said light sources are connected by wiring which has a substantially Z-shaped folded configuration interposed between said light sources to accommodate pull forces applied to said leash without damage to said wiring; and
said elongated body comprises a biasing element adjacent said handle which accommodates pull forces and sideways forces applied to said leash without causing damage to said wiring;
wherein said biasing element extends over and encloses at least a portion of said wire which extends through said biasing element.

11. The animal restraint of claim 10, further comprising a light source device which powers said light sources.

12. The animal restraint of claim 11, wherein light sources comprise light emitting diodes.

13. The animal restraint of claim 10, wherein said wiring comprises a plurality of folds therein to accommodate stretching of the restraint without wiring and light source damage.

14. The animal restraint of claim 11, wherein said light source device comprises a transistor, resistors and a conductor for delivering power from a power source.

15. The animal restraint of claim 10, wherein said restraint further comprises a collar fabricated from transparent or translucent material.

16. The animal restraint of claim 15, wherein said collar comprises a tab, a housing, a male clasp and a female clasp, and a plurality of light sources extending along said collar.

\* \* \* \* \*